United States Patent
Ananthakrishnan et al.

(10) Patent No.: US 9,594,560 B2
(45) Date of Patent: Mar. 14, 2017

(54) ESTIMATING SCALABILITY VALUE FOR A SPECIFIC DOMAIN OF A MULTICORE PROCESSOR BASED ON ACTIVE STATE RESIDENCY OF THE DOMAIN, STALL DURATION OF THE DOMAIN, MEMORY BANDWIDTH OF THE DOMAIN, AND A PLURALITY OF COEFFICIENTS BASED ON A WORKLOAD TO EXECUTE ON THE DOMAIN

(71) Applicant: Intel Corporation, Santa Clara, CA (US)

(72) Inventors: Avinash N. Ananthakrishnan, Portland, OR (US); Stephen H. Gunther, Beaverton, OR (US); Jeremy J. Shrall, Portland, OR (US); Jay D. Schwartz, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 467 days.

(21) Appl. No.: 14/039,151

(22) Filed: Sep. 27, 2013

(65) Prior Publication Data

US 2015/0095620 A1     Apr. 2, 2015

(51) Int. Cl.
*G06F 1/00*      (2006.01)
*G06F 9/30*      (2006.01)
(Continued)

(52) U.S. Cl.
CPC .......... *G06F 9/30083* (2013.01); *G06F 1/324* (2013.01); *G06F 1/3206* (2013.01);
(Continued)

(58) Field of Classification Search
CPC ...... G06F 1/324; G06F 1/3203; G06F 1/3206; G06F 1/3225; G06F 1/3296;
(Continued)

(56) References Cited

U.S. PATENT DOCUMENTS 5,163,153 A    11/1992  Cole et al.
5,522,087 A     5/1996  Hsiang
(Continued)

FOREIGN PATENT DOCUMENTS

EP          1 282 030 A1     5/2003

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.
(Continued)

*Primary Examiner* — Thomas Lee
*Assistant Examiner* — Zhipeng Wang
(74) *Attorney, Agent, or Firm* — Trop, Pruner & Hu, P.C.

(57) ABSTRACT

In an embodiment, a processor includes a first logic to calculate a scalability value for a processor domain based at least in part on an active state residency, a stall duration, and a memory bandwidth of the domain, and to determine an operating frequency update for the domain based at least in part on a current operating frequency of the domain and the scalability value. Other embodiments are described and claimed.

18 Claims, 9 Drawing Sheets

(51) Int. Cl.
  *G06F 11/34* (2006.01)
  *G06F 12/08* (2016.01)
  *G06F 9/48* (2006.01)
  *G06F 1/32* (2006.01)

(52) U.S. Cl.
  CPC .......... *G06F 1/3275* (2013.01); *G06F 1/3287* (2013.01); *G06F 1/3296* (2013.01); *G06F 9/4893* (2013.01); *G06F 11/3466* (2013.01); *G06F 12/084* (2013.01); *Y02B 60/1217* (2013.01); *Y02B 60/1282* (2013.01); *Y02B 60/1285* (2013.01)

(58) Field of Classification Search
  CPC ............. G06F 11/3423; G06F 11/3466; G06F 12/084; G06F 1/32; G06F 1/3275; G06F 9/4893
  See application file for complete search history.

(56) References Cited

U.S. PATENT DOCUMENTS

| | | |
|---|---|---|
| 5,590,341 A | 12/1996 | Matter |
| 5,621,250 A | 4/1997 | Kim |
| 5,931,950 A | 8/1999 | Hsu |
| 6,748,546 B1 | 6/2004 | Mirov et al. |
| 6,792,392 B1 | 9/2004 | Knight |
| 6,823,516 B1 | 11/2004 | Cooper |
| 6,829,713 B2 | 12/2004 | Cooper et al. |
| 6,996,728 B2 | 2/2006 | Singh |
| 7,010,708 B2 | 3/2006 | Ma |
| 7,043,649 B2 | 5/2006 | Terrell |
| 7,093,147 B2 | 8/2006 | Farkas et al. |
| 7,111,179 B1 | 9/2006 | Girson et al. |
| 7,194,643 B2 | 3/2007 | Gonzalez et al. |
| 7,272,730 B1 | 9/2007 | Acquaviva et al. |
| 7,412,615 B2 | 8/2008 | Yokota et al. |
| 7,434,073 B2 | 10/2008 | Magklis |
| 7,437,270 B2 | 10/2008 | Song et al. |
| 7,454,632 B2 | 11/2008 | Kardach et al. |
| 7,529,956 B2 | 5/2009 | Stufflebeam |
| 7,539,885 B2 | 5/2009 | Ma |
| 7,730,340 B2 | 6/2010 | Hu et al. |
| 2001/0044909 A1 | 11/2001 | Oh et al. |
| 2002/0194509 A1 | 12/2002 | Plante et al. |
| 2003/0061383 A1 | 3/2003 | Zilka |
| 2004/0064752 A1 | 4/2004 | Kazachinsky et al. |
| 2004/0098560 A1 | 5/2004 | Storvik et al. |
| 2004/0139356 A1 | 7/2004 | Ma |
| 2004/0268166 A1 | 12/2004 | Farkas et al. |
| 2005/0022038 A1 | 1/2005 | Kaushik et al. |
| 2005/0033881 A1 | 2/2005 | Yao |
| 2005/0132238 A1 | 6/2005 | Nanja |
| 2006/0050670 A1 | 3/2006 | Hillyard et al. |
| 2006/0053326 A1 | 3/2006 | Naveh |
| 2006/0059286 A1 | 3/2006 | Bertone et al. |
| 2006/0069936 A1 | 3/2006 | Lint et al. |
| 2006/0117202 A1 | 6/2006 | Magklis et al. |
| 2006/0184287 A1 | 8/2006 | Belady et al. |
| 2007/0005995 A1 | 1/2007 | Kardach et al. |
| 2007/0016817 A1 | 1/2007 | Albonesi et al. |
| 2007/0079294 A1 | 4/2007 | Knight |
| 2007/0106827 A1 | 5/2007 | Boatright et al. |
| 2007/0156992 A1 | 7/2007 | Jahagirdar |
| 2007/0214342 A1 | 9/2007 | Newburn |
| 2007/0239398 A1 | 10/2007 | Song et al. |
| 2007/0245163 A1 | 10/2007 | Lu et al. |
| 2008/0028240 A1 | 1/2008 | Arai et al. |
| 2008/0034236 A1* | 2/2008 | Takayama ............ G06F 1/3203 713/322 |
| 2008/0250260 A1 | 10/2008 | Tomita |
| 2008/0288796 A1* | 11/2008 | Nakamura ................ G06F 1/32 713/320 |
| 2009/0006871 A1 | 1/2009 | Liu et al. |
| 2009/0150695 A1 | 6/2009 | Song et al. |
| 2009/0150696 A1 | 6/2009 | Song et al. |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172428 A1 | 7/2009 | Lee |
| 2009/0217277 A1* | 8/2009 | Johnson ................ G06F 9/3851 718/102 |
| 2009/0235105 A1 | 9/2009 | Branover et al. |
| 2010/0115309 A1 | 5/2010 | Carvalho et al. |
| 2010/0146513 A1 | 6/2010 | Song |
| 2010/0162023 A1 | 6/2010 | Rotem et al. |
| 2010/0191997 A1 | 7/2010 | Dodeja et al. |
| 2011/0154090 A1 | 6/2011 | Dixon et al. |
| 2011/0264938 A1* | 10/2011 | Henroid ................ G06F 1/3203 713/323 |
| 2012/0054519 A1 | 3/2012 | Branover et al. |
| 2012/0079290 A1 | 3/2012 | Kumar |
| 2012/0192200 A1* | 7/2012 | Rao ........................ G06F 9/4893 718/105 |
| 2012/0246506 A1 | 9/2012 | Knight |
| 2012/0297232 A1* | 11/2012 | Bircher .................... G06F 1/324 713/500 |
| 2013/0061064 A1 | 3/2013 | Ananthakrishnan et al. |
| 2013/0080803 A1 | 3/2013 | Ananthakrishnan et al. |
| 2013/0080804 A1 | 3/2013 | Ananthakrishnan et al. |
| 2013/0111120 A1 | 5/2013 | Ananthakrishnan et al. |
| 2013/0111121 A1 | 5/2013 | Ananthakrishnan et al. |
| 2013/0111226 A1 | 5/2013 | Ananthakrishnan et al. |
| 2013/0111236 A1 | 5/2013 | Ananthakrishnan et al. |
| 2013/0205149 A1* | 8/2013 | Chen ..................... G06F 1/3225 713/322 |
| 2014/0089699 A1* | 3/2014 | O'Connor ............... G06F 1/324 713/322 |
| 2014/0101420 A1* | 4/2014 | Wu ........................ G06F 1/3206 713/1 |

OTHER PUBLICATIONS

SPEC—Power and Performance, Design Overview V1.10, Standard Performance Information Corp., Oct. 21, 2008, 6 pages.
Intel Technology Journal, "Power and Thermal Management in the Intel Core Duo Processor," May 15, 2006, pp. 109-122.
Anoop Iyer, et al., "Power and Performance Evaluation of Globally Asynchronous Locally Synchronous Processors," 2002, pp. 1-11.
Greg Semeraro, et al., "Hiding Synchronization Delays In A GALS Processor Microarchitecture," 2004, pp. 1-13.
Joan-Manuel Parcerisa, et al., "Efficient Interconnects for Clustered Microarchitectures," 2002, pp. 1-10.
Grigorios Magklis, et al., "Profile-Based Dynamic Voltage and Frequency Scalling for a Multiple Clock Domain Microprocessor," 2003, pp. 1-12.
Greg Semeraro, et al., "Dynamic Frequency and Voltage Control for a Multiple Clock Domain Architecture," 2002, pp. 1-12.
Greg Semeraro, "Energy-Efficient Processor Design Using Multiple Clock Domains with Dynamic Voltage and Frequency Scaling," 2002, pp. 29-40.
Diana Marculescu, "Application Adaptive Energy Efficient Clustered Architectures," 2004, pp. 344-349.
L. Benini, et al., "System-Level Dynamic Power Management," 1999, pp. 23-31.
Ravindra Jejurikar, et al., "Leakage Aware Dynamic Voltage Scaling for Real-Time Embedded Systems," 2004, pp. 275-280.
Ravindra Jejurikar, et al., "Dynamic Slack Reclamation With Procrastination Scheduling in Real-Time Embedded Systems," 2005, pp. 13-17.
R. Todling, et al., "Some Strategies for Kalman Filtering and Smoothing," 1996, pp. 1-21.
R.E. Kalman, "A New Approach to Linear Filtering and Prediction Problems," 1960, pp. 1-12.
International Application No. PCT/US2012/028865, filed Mar. 13, 2012, entitled "Providing Efficient Turbo Operation of a Processor," by Intel Corporation.
International Application No. PCT/US2012/028902, filed Mar. 13, 2012, entitled "Dynamically Controlling Interconnect Frequency in a Processor," by Intel Corporation.

(56) References Cited

OTHER PUBLICATIONS

International Application No. PCT/US2012/028876, filed Mar. 13, 2012, entitled "Dynamically Computing an Electrical Design Point (EDP) for a Multicore Processor," by Intel Corporation.
U.S. Appl. No. 13/600,568, filed Aug. 31, 2012, entitled, "Configuring Power Management Functionality in a Processor," by Malini K. Bhandaru, et al.
European Patent Office, Extended Search Report mailed Oct. 16, 2015 in European Patent Application No. 14186145.0.

* cited by examiner

US 9,594,560 B2

ESTIMATING SCALABILITY VALUE FOR A SPECIFIC DOMAIN OF A MULTICORE PROCESSOR BASED ON ACTIVE STATE RESIDENCY OF THE DOMAIN, STALL DURATION OF THE DOMAIN, MEMORY BANDWIDTH OF THE DOMAIN, AND A PLURALITY OF COEFFICIENTS BASED ON A WORKLOAD TO EXECUTE ON THE DOMAIN

TECHNICAL FIELD

Embodiments relate to power management of a system, and more particularly to power management of a multicore processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

DETAILED DESCRIPTION

In various embodiments, a dynamic calculation of scalability of a workload being executed in a processor of a computing system having one or more multicore processors may be made and used to more effectively allocate power consumption in the system. Having an understanding of how performance of the workload scales with frequency of one or more components of the processor can be useful in determining whether there is a benefit in increasing the frequency (and hence consuming more power) of one or more components of such processors.

Current processors integrate a variety of compute components into a single die. Some of these components may have their own voltage and frequency domain. As used herein, a "domain" is used to mean a collection of hardware and/or logic that operates at the same voltage and frequency point. The frequency of the components and hence the power consumed can be varied through dynamic voltage frequency scaling (DVFS) based on the performance level desired. The scaling of performance delivered by a component with an increase in frequency depends on several factors. Some of these factors include identifying how memory bound a workload is, what resources the workload is contending for, among others, such as whether a workload is waiting on input/output (I/O) accesses to complete.

In a processor having a variety of components integrated in a single die along with a multi-level cache hierarchy and an integrated memory controller, identifying whether a workload's performance is scalable with frequency may aid in determining how to share power between the components. When it is known that workload performance does not scale with frequency, the workload may be executed at a lower frequency and thus at a more energy efficient point with a small impact to performance.

Embodiments provide techniques to estimate the scalability of a workload running on one or more compute domains of a processor. Based on this scalability estimate, power management decisions may be made to enable improved performance and energy efficiency. As one example, a scalability estimate may be calculated for a workload being executed on an integrated graphics compute domain of the processor. Of course, the scope of the present invention is not limited in this regard and similar scalability estimates may be calculated for one or more workloads being executed on general purpose processor cores (each possibly of its own domain) and/or other compute domains of the processor.

Figure 1:
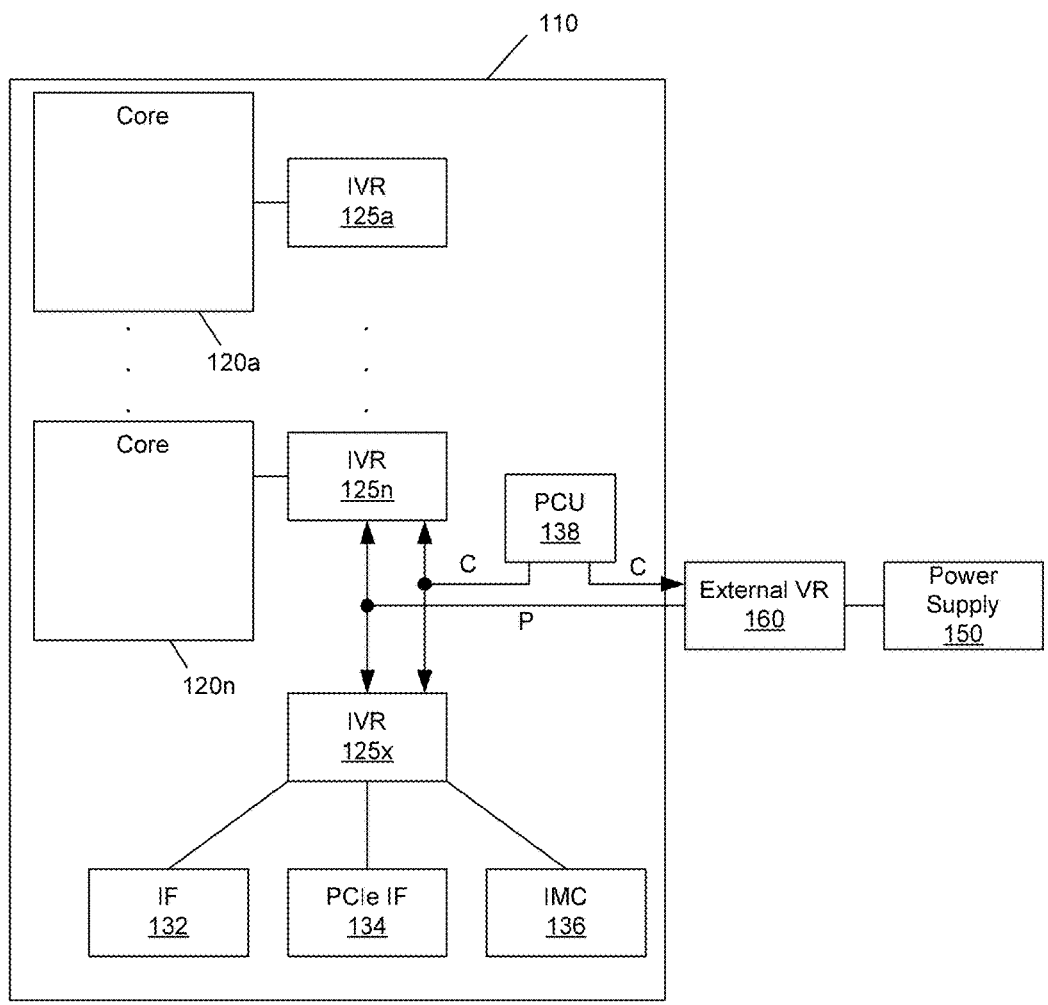
FIG. 1 is a block diagram of a system in accordance with an embodiment of the present invention.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance.

Still referring to FIG. 1, additional components may be present within the processor including an input/output interface 132, another interface 134, and an integrated memory controller 136. In operation, memory controller 136 consolidates memory requests from the core domains, graphics domains and other devices attached to the processor and schedules these requests to system memory. In an embodiment, memory controller 136 includes, among many other queues and counters, counters that track: the number of read, write and command requests sent to a system memory (e.g., as implemented as a dynamic random access memory (DRAM) formed of a plurality of dual inline memory modules (DIMMs)); and the number of memory read and write requests issued by each compute or IO device.

As seen in FIG. 1, each of these components may be powered by another integrated voltage regulator $125_x$. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007).

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include logic to dynamically determine scalability of workloads executing on domains of the processor. Then based on the determined scalability values, power management logic of the PCU may take appropriate power management actions, either directly or indirectly responsive to the scalability values, as described herein.

While not shown for ease of illustration, understand that additional components may be present within processor 110 such as uncore logic, one or more graphic domains, and other components such as internal memories, e.g., one or more levels of a cache memory hierarchy and so forth. In one example, a cache hierarchy includes a last level cache (LLC) as a highest cache level that is physically integrated on the same die as the compute domains. The LLC is typically the largest cache memory in the processor and is located furthest away from the compute domains (e.g., cores 120).

Furthermore, while shown in the implementation of FIG. 1 with an integrated voltage regulator, embodiments are not so limited. Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Note that the scalability analysis and scalability-influenced power management described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

In an embodiment, processor 100 may further include one or more graphics engines that each may be an independently variable voltage and frequency domain. The graphics engines can be dynamically voltage and frequency scaled to meet power, performance and thermal targets. In an embodiment, a graphics engine includes execution units, fixed function units among other processing entities.

In a system operating according to an ACPI OS-based power management system, the C0 state is an active state of a compute domain. For example on a core, this is the state where the core is actively executing and retiring instructions. For a graphics engine, this is state in which execution units, shaders, and other fixed function units of the engine are actively processing data.

These compute/processing entities periodically access data that is stored in an internal cache memory or system memory. When requested data is being accessed by a compute engine, the engine typically spends time at a current operating voltage and frequency point waiting for data to return, e.g., from the LLC or system memory. During this interval, the compute engine may not have any useful work to perform, and thus the compute engine is consuming power as its clocks are fully toggling (and often at peak operating frequency). A period in a workload where a compute domain is waiting for data to be fetched from a memory subsystem (e.g., LLC or system memory) is referred to herein as a 'low scalable' region. Here scalability refers to a performance unit increase obtained for a unit increase in frequency. Using an embodiment of the present invention, predictions may be made for workload phases in terms of whether they are scalable (or not), and this information can be utilized in modulating operating frequency of some or all of a compute domain. When a 'low scalable' phase is predicted, an operating frequency of a domain may be reduced and hence power is reduced when useful work is not being done.

Embodiments thus provide techniques to identify the scalability of workload phases. A variety of different actions can be taken once such workload phases are identified. In a system where there is only a single kind of execution unit (e.g., a processor including general purpose compute engines), one action may be to reduce operating frequency of such engines determined to have low scalability, during the periods of this low scalability. In an implementation in which a processor includes different kinds of compute domains, scalability information may be determined for each of the compute domains. From this information, a determination may be made as to which domain would benefit most from sharing a larger portion of the overall processor's power, thermal and electrical resources.

Many different components may be used in estimating workload scalability of a domain. However, for example purposes a variety of different counters may be used to obtain information for estimating scalability. In an embodiment, a first counter is a C0 residency counter which is a counter that counts the number of cycles in which an execution unit is in an active state (e.g., a C0 state). A second counter in this embodiment is a memory stall counter which is a counter that counts the number of cycles in which all execution units in a given domain are waiting for a memory transaction to complete to make forward progress. A typical example of this is where a core is waiting for a large chunk of data to be fetched from system memory, and useful computation action is being pended, waiting for the required data operands to be fetched into the execution unit's computation pipelines.

A third counter in this embodiment is one or more memory bandwidth counters which are a set of one or more counters that track the number of different types of memory transactions that are being issued by a domain. For example, these counters may track the total number of read or write transactions being sent to system memory or an internal cache hierarchy from a domain. In an implementation where there is hierarchical memory architecture with an embedded DRAM (EDRAM) within a processor package followed by system memory, the memory bandwidth counters can include individual counters that track the total read and write transactions from each domain to each level of the memory hierarchy. In the above example, this third counter set may include counters tracking the number of read and write accesses heading to the EDRAM and read and write counters tracking the accesses headed towards system memory. Of course, while described with these particular counters in this embodiment, understand that embodiments are not so limited and more, fewer, and different counters may be present in another embodiment.

Figure 2:
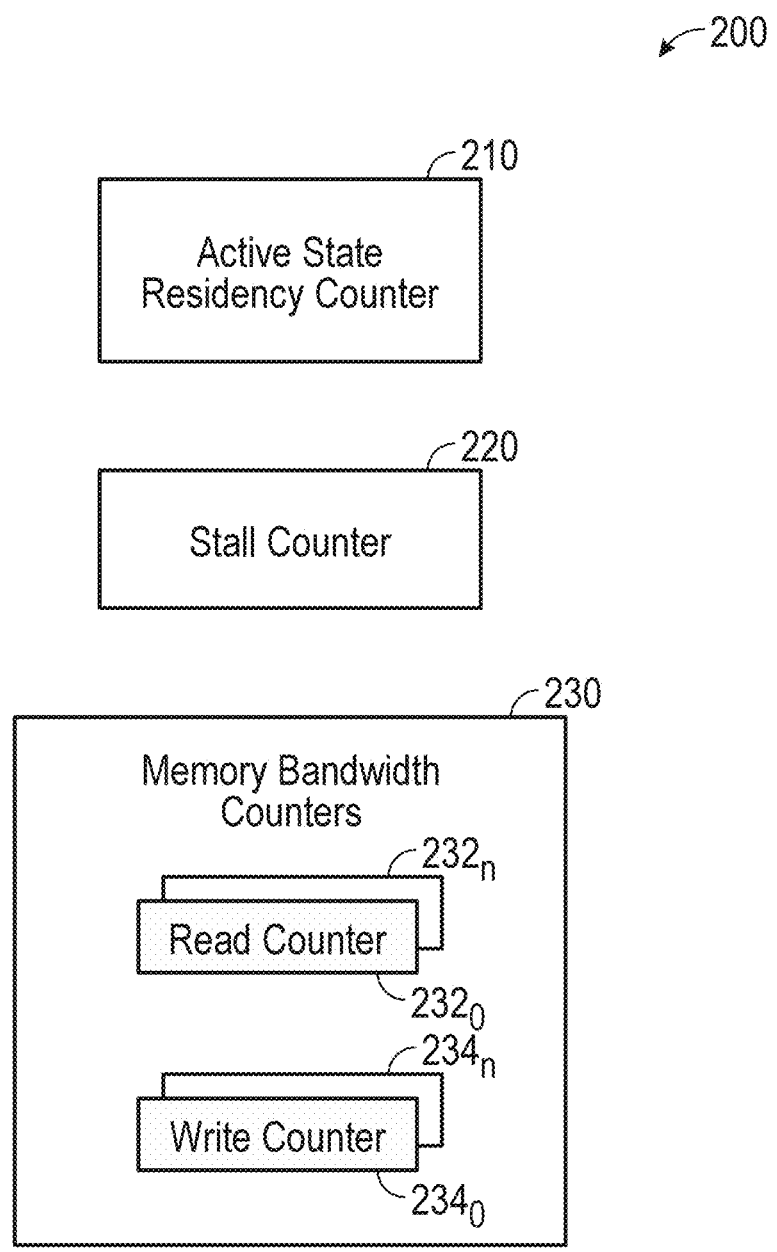
FIG. 2 is a block diagram of a portion of a processor core in accordance with an embodiment of the present invention.

Referring now to FIG. 2, shown is a block diagram of a portion of a processor core in accordance with an embodiment of the present invention. Specifically, FIG. 2 shows a portion of a core 200 including various counters that can be leveraged in performing a scalability analysis in accordance with an embodiment of the present invention. Note that these counters may be configured to count certain types of overall operations with regard to core performance. However in other implementations multiple sets of such counters may be present in a single core or other engine of a processor to more finely count processor operations. For example, in some embodiments each of the different sections of an execution portion of a core may have an associated set of counters.

As shown in FIG. 2, these counters include a first counter 210, a second counter 220, and a third counter 230 (that itself includes a plurality of individual counters). More specifically, first counter 210 is an active state residency counter that is configured to count processor cycles in which the core is in an active, e.g., C0 state. In turn, second counter is a stall counter that is configured to count cycles of processor operation when no execution unit of the core is actively performing work. That is, stall counter 220 is configured to count cycles in which the entire core is prevented from performing useful work while it waits for the requested data to be returned from a memory hierarchy.

Still with reference to FIG. 2, third counter 230 includes a set of memory bandwidth counters. More specifically, a set of read counters $232_0$-$232_n$ may be present, along with a set of write counters $234_0$-$234_n$. In the embodiment shown, each of these individual read and write counters may be associated with a corresponding portion of a memory hierarchy, such that each counter is configured to count memory requests made from the core to the corresponding portion of the memory hierarchy (and for the type of memory operation).

As will be described further below, scalability determinations may be made for workloads being executed within a processor using information from these various counters shown in FIG. 2. Of course understand that although shown with these particular counters in the embodiment of FIG. 2, the scope of the present invention is not limited in this regard.

Different manners of estimating workload scalability may occur in different embodiments. For purposes of illustration using the above-described counters, the following operations may be performed to estimate workload scalability. First, the total C0 residency time is computed for a given execution domain. Then the total memory stall duration for the execution domain is computed. Further, the various memory bandwidth counters may be sampled, and the total memory bandwidth consumed by each execution domain is calculated. In an embodiment, this memory bandwidth consumption determination may be sub-divided into read and write bandwidth counts for each level of the memory hierarchy. The below example assumes a single memory hierarchy with counters tracking the total read and write bandwidth consumed by each execution domain. Of course, finer-grained analysis may occur in other embodiments.

In an embodiment, the scalability of a given compute domain can be determined in accordance with the following equation:

$$\text{Scalability} = (A * C0\_residency\_time + B * Memory\_Stalled\_time + C * Memory\_Read\_bandwidth + D * Memory\_Write\_bandwidth) / C0\_residency\_time \quad [\text{EQ. 1}].$$

Here, coefficients A, B, C, D may be obtained via an empirical estimation process, details of which are described below. The above process may be repeated to compute the scalability of each execution domain. Of course understand that different scalability determinations may be made in various embodiments.

In different embodiments, the appropriate interval over which scalability of an execution domain is to be computed can be arrived at either through a clear understanding of the workload or through an empirical tuning process. For example, for a graphics workload, a natural choice of the time interval over which to estimate scalability is the average frame duration. If the compute requirement and memory access patterns to render a frame show distinct phases, then scalability estimations of such workload phases that last much shorter than the entire frame processing interval instead may be used.

Figure 3:
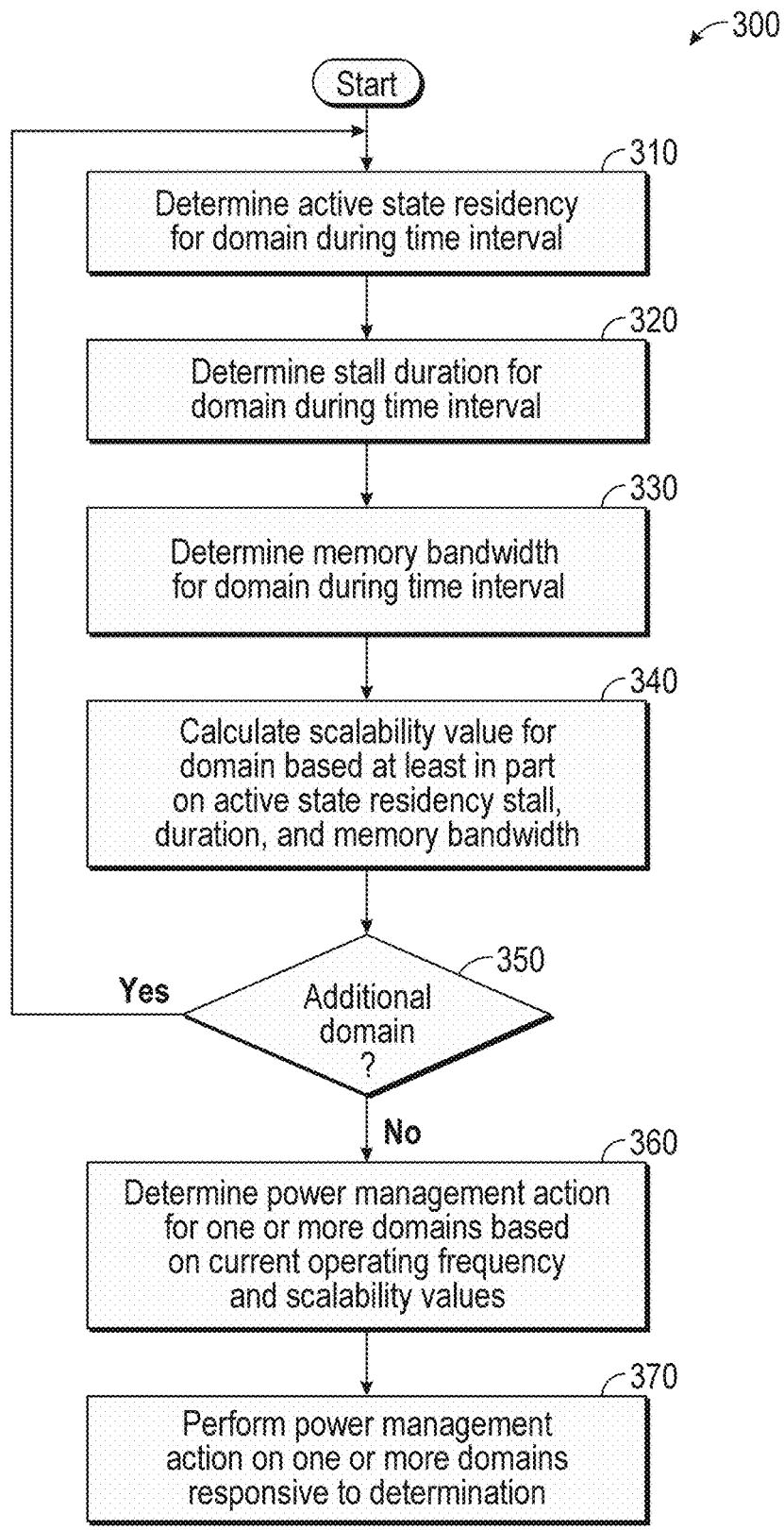
FIG. 3 is a flow diagram of a method for performing a scalability analysis of a workload in accordance with an embodiment of the present invention.

Referring now to FIG. 3, shown is a flow diagram of a method for performing a scalability analysis of a workload in accordance with an embodiment of the present invention. In an embodiment, method 300 may be performed by logic of a processor such as a power controller of a processor core. For example, a PCU may include hardware, software and/or firmware, including scalability analysis logic to perform at least portions of the operations of FIG. 3.

In the embodiment of FIG. 3, method 300 begins by determining an active state residency for a domain during a time interval (block 310). In an embodiment, this determination may be based on a residency counter such as a C0 residency counter for a given core. For purposes of discussion of method 300, the domain under analysis is assumed to be a core. Understand that in other embodiments however, different domains, including graphics domains, fixed function units or individual portions of a larger domain may be the unit of analysis for the scalability calculations described herein. As to the time interval, understand that different lengths of evaluation intervals are contemplated for different embodiments. For example, for analysis of a workload phase for graphics processing, the time interval may correspond to the time consumed in a processing a frame's worth of graphics data.

Still with reference to FIG. 3, method 300 then continues by determining a stall duration for the domain during the time interval (block 320). In an embodiment, a stall counter may be read to obtain this information. Then at block 330 a memory bandwidth for the domain may be determined for the time interval. For purposes of this analysis, one or more memory bandwidth counters may be read to obtain this information.

Next, a scalability value may be calculated for the domain (block 340). More specifically, based at least in part on the above-determined information, namely active state residency, stall duration, and memory bandwidth, a scalability value may be calculated. In an embodiment this scalability value may be calculated according to EQ. 1 above. Of course other equations or algorithms instead may be used to determine a scalability value.

Next it can be determined whether one or more additional domains are present for which a scalability determination is desired (diamond 350). If so, a loop proceeds beginning again at block 310. Otherwise, control passes to block 360. There one or more power management actions may be determined for one or more domains. More specifically, based on the current operating frequency and the scalability values, an appropriate power management action may be determined. As examples, the power management actions may include throttling-type actions in which an operating frequency of one or more domains is reduced. Alternately another throttling-based action such as reducing bandwidth of one or more domains, e.g., memory bandwidth can occur.

As one particular example, assume two domains are present and have different scalability values: a first scalability value for a first domain indicates that the domain is in a workload phase that has high scalability, while in contrast a second scalability value for a second domain indicates that it is in a workload phase that has low scalability. In this case, the power management determination may select an increased operating frequency for the first domain and a decreased operating frequency for the second domain.

Next, the power management action may be performed on one or more domains responsive to the determination (block 370). For example, scalability analysis logic of a PCU or other power controller may signal a frequency control logic of the PCU to adjust the operating frequency appropriately. Or in the case of a bandwidth throttling operation, scalability analysis logic may communicate with a memory controller to throttle bandwidth of one or more domains. Although shown at this high level in the embodiment of FIG. 3, understand the scope of the present invention is not limited in this regard.

That is, other use cases are possible. For example, instead of performing the power management action directly responsive to the determination made in the scalability analysis logic, the scalability values determined according to method 300 may be communicated to another system agent such as third party software, e.g., an OS executing on the system. In turn, the OS may use the scalability values to determine the appropriate power management action to be taken and communicate various information back to the PCU. For example, in one usage scenario the OS can analyze the scalability values and determine an explicit action to be taken based on the scalability values. In an embodiment such explicit actions may be OS-based communication of P-state requests from the OS to the PCU.

Instead in another use case, OS-provided power management hints may be sent. In such case, rather than sending an explicit P-state request, the OS may communicate hints to indicate weightings for the different domains. For example, assume a two domain processor including a core domain and a graphics domain. Also assume that the scalability analysis logic determines that each of these domains is executing an independent workload having equal scalability values (e.g., both having a scalability value of 50). However, assume that the OS seeks to devote more resources to the workload being performed on the graphics domain. In this case, the OS may provide hint values to the PCU that weights the graphics domain higher than the core domain (e.g., 2× to 1×). In this case, upon receipt of such hint values from the OS, the PCU may adjust the raw scalability values to obtain modified scalability values. In this case, these hint values result in a modified scalability value of 75% for the graphics domain and a modified scalability value of 25% for the core domain, as an example. Then according to these modified scalability values, the PCU may take appropriate power management actions, e.g., throttling the operating frequency of the core domain and possibly raising the operating frequency of the graphics domain. Of course understand that while described with this particular example, other illustrations are possible.

Accordingly, a variety of different usage models exist for the scalability values. In one usage model, a PCU-centric model is provided in which the scalability values are determined within the PCU and used directly by the PCU to determine and take appropriate power management actions. Instead in another usage model, the determined scalability values may be communicated to third party software such as an OS. Two possible flavors of this usage model exist: a first control technique in which the OS provides explicit requests based on the scalability values; and a second control technique in which the OS provides hint information to the PCU to enable the PCU to determine and perform appropriate power management actions.

As discussed above, an empirical process may be used to obtain coefficients to estimate workload scalability. Also as described above, the true measure of scalability of a workload is given by the unit gain in performance for unit gain in frequency. By varying operating frequency and holding each of the frequency points constant over the same workload phase, the actual scalability of that workload phase to operating frequency may be determined. If a large sample of a workload phase executed at different operating frequencies is characterized and data (e.g., counter values) are collected, a linear regression analysis may be performed to arrive at appropriate values of the coefficients (e.g., A, B, C, D).

Referring now to Table 1, shown is a sample data set showing a variety of workload phases with corresponding count values and measured scalability values.

TABLE 1

|  | C0 Count | Stall Count | Measured Scalability |
| --- | --- | --- | --- |
| Workload 1 | 100 | 25 | 0.875 |
| Workload 2 | 100 | 50 | 0.75 |
| Workload 3 | 100 | 75 | 0.625 |

In an embodiment, the above Equation [1] can be simplified to estimate scalability as follows:

$$\text{Scalability} = (A*C0\_counts + B*\text{Stall\_counts}) / C0\_counts \quad [EQ. 2].$$

Using the above data set of Table 1 and selecting a value of A=1 and B=−0.5 for the coefficients leads to a reasonable estimate of the scalability of the above workloads with simplified processing.

In certain embodiments, a linear regression-based approach may be used in which a larger number of workloads and a larger set of counters/statistics are included to arrive at values for coefficients A, B, C, D (and possibly additional coefficients).

Figure 4:
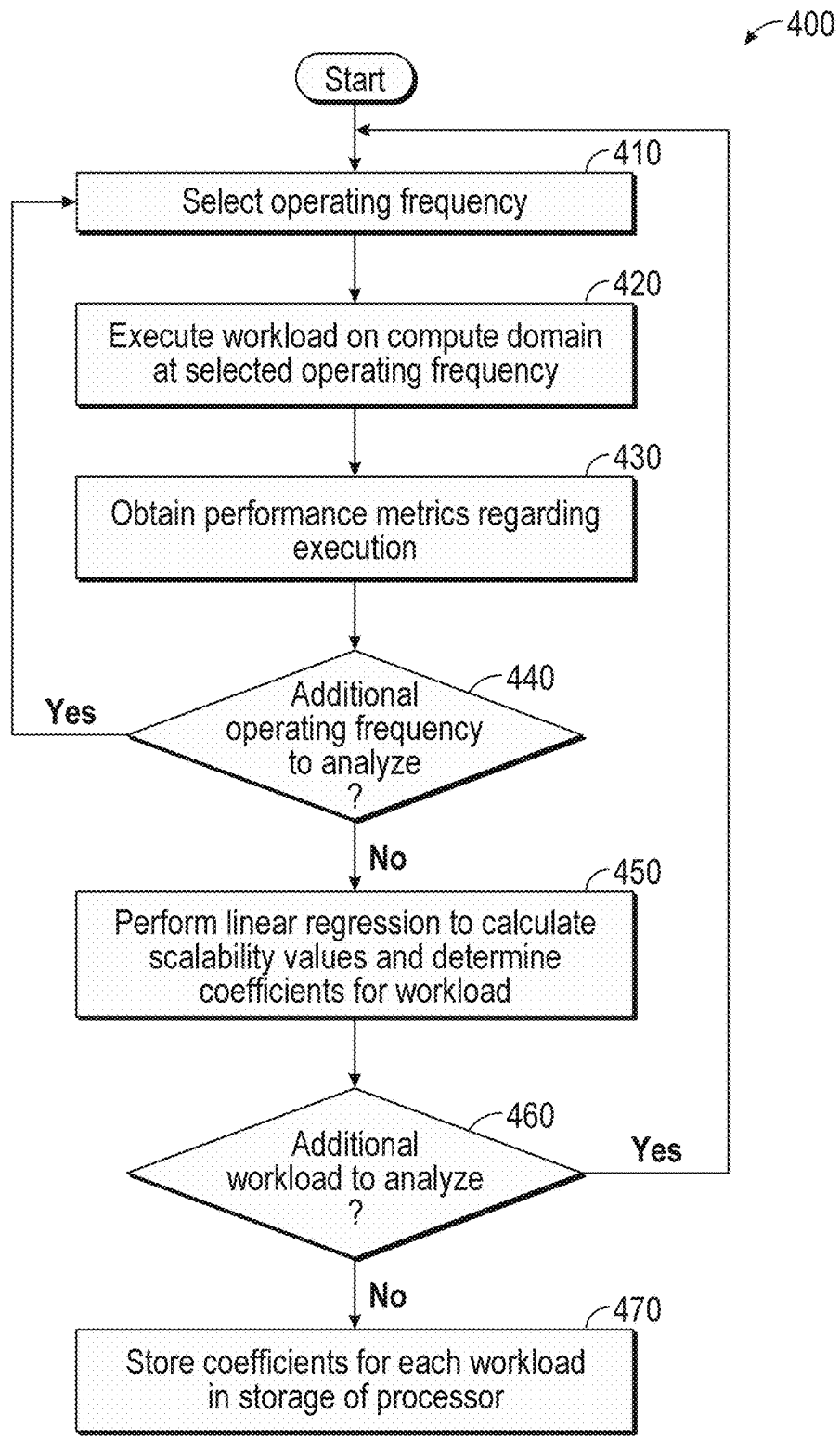
FIG. 4 is a flow diagram of a method for performing a linear regression in accordance with an embodiment of the present invention.

Referring now to FIG. 4, shown is a flow diagram of a method for performing a linear regression analysis in accordance with an embodiment of the present invention. As shown in FIG. 4, method 400 may be used in part to determine one or more sets of coefficients for use in the scalability techniques described herein. In an embodiment, method 400 may be performed during development of a processor including logic to perform the scalability techniques described herein.

As seen, method 400 begins by selecting an operating frequency (block 410). In an embodiment, a range of frequencies may be tested beginning from a first operating frequency, e.g., at 1 GHz, and increasing from there as a loop is traversed number of times. Then, at block 420 a workload may be executed on the compute domain at the selected operating frequency. In some implementations, a prototype processor may be used to perform the method such that actual operation of the workload is effected. In other embodiments, simulations may be performed to simulate execution of the workload.

In either case, at block 430 performance metrics may be obtained regarding the execution. In an embodiment, workload performance data may be reported by the workload.

Next, it can be determined whether there are additional operating frequencies to analyze (diamond 440). If so, the loop is traversed again beginning at block 410. Assume the loop was performed for two frequency points providing performance data S1 and S2, each at one of and the two frequency points F1 and F2. From this workload scalability at F1 can be calculated as Scalability=((S2−S1)/S1)/((F2−F1)/F1). As an illustration with reference to Table 2 below, for a 200% increase in frequency, the score increases by 10%. Using the formula listed above, the scalability works out to be 5%. Thus for every 100% increase in frequency, performance increases by 5%.

TABLE 2

| Frequency | Score |
| --- | --- |
| 100 | 1 |
| 300 | 1.1 |

Still with reference to FIG. 4, otherwise, control passes to block 450 where a linear regression may be performed to calculate scalability values and to determine appropriate coefficients for the workload.

Then it can be determined whether there are additional workloads to be analyzed (diamond 460). As an example, many different types of workloads, ranging from computation intensive workloads, graphics intensive workloads, network processing and other workloads may be analyzed to generate corresponding sets of coefficients appropriate for different workloads that are expected to be performed on the manufactured processor.

When all the analysis is completed and there are no further workloads for analysis, these coefficients may be stored (block 470). More specifically, during a manufacturing run for the processor these coefficients may be stored as hardcoded values within the processor, e.g., as fuses, as entries in a non-volatile storage or in another such manner. Of course understand that embodiments are not limited in this regard and the coefficient storage may take other forms such as providing the coefficients within a platform for loading into the processor during startup operations. Although shown at this high level in the embodiment of FIG. 4, understand the scope of the present invention is not limited in this regard.

Thus in some embodiments, different sets of coefficients can be used to predict scalability based on the nature of the workload. For example if a graphics execution engine is actively rendering 3D games, a first set of coefficients (e.g., A1, B1, C1, D1, etc.) can be used. Instead a different set of coefficients (e.g., A2, B2, C2, D2, etc.) can be used if the workload under consideration is a media transcoding or video playback workload (and note that these 2 workloads also may have their own coefficients associated with them). In yet another embodiment different sets of coefficients may be used based on certain microarchitectural activity counts. For example, if the write bandwidth to main memory is greater than a certain threshold, a first set of coefficients (e.g., A1, B1, C1, D1) may be used, and otherwise a second set of coefficients (e.g., A2, B2, C2, D2) may be used.

After a workload phase's scalability is estimated accurately, it can be used in several ways. First, the scalability may be used to maximize energy efficiency by lowering the operating frequency of a domain running a workload that is not currently scalable. Second, the scalability may be used to determine, in a processor having multiple compute domains, which of the domains is currently running a higher scalable workload and thus use this information to re-partition the shared resources between the various compute domains, where multiple compute domains share resources.

In one example, if the scalability of the compute domain is estimated to be low, when there is a large demand for memory bandwidth, in addition to reducing the operating frequency of the compute domain, the operating frequency of the memory subsystem can be increased to increase the bandwidth available to the compute domain. Embodiments thus use scalability predictions to re-partition system resources to maximize performance and energy efficiency. For example, when a scalability value of a compute domain is less than a threshold value, an operating frequency of a memory subsystem can be increased, in addition to reducing the operating frequency of the compute domain.

In this way, different power management actions can be taken as a function of how scalable a workload is, which may cause a domain's operating frequency behavior to vary over different kinds of workloads. That is, the operating frequency may increase for a scalable workload (having a relatively high scalability prediction), while the operating frequency may decrease for a non-scalable workload (having a relatively low scalability prediction).

Embodiments may consider a variety of different performance metrics such as memory access pattern statistics, e.g., read/write counts, cache hit rates, etc. Use of a variety of different metrics leads to better-informed scalability estimates over a mechanism that predicts scalability purely based on a given percentage of stall duration over an evaluation interval.

Embodiments thus use activity counters combined with a linear regression-based approach to estimate the scalability of a workload phase on a given compute domain. The linear regression process may be used to determine coefficients used to estimate scalability, and different sets of coefficients may be used based on workload characteristics. In addition, different sets of counters may be used with different sets of coefficients, based on workload characteristics (e.g., type of workload, workload phase, etc.) to predict scalability.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Figure 5:
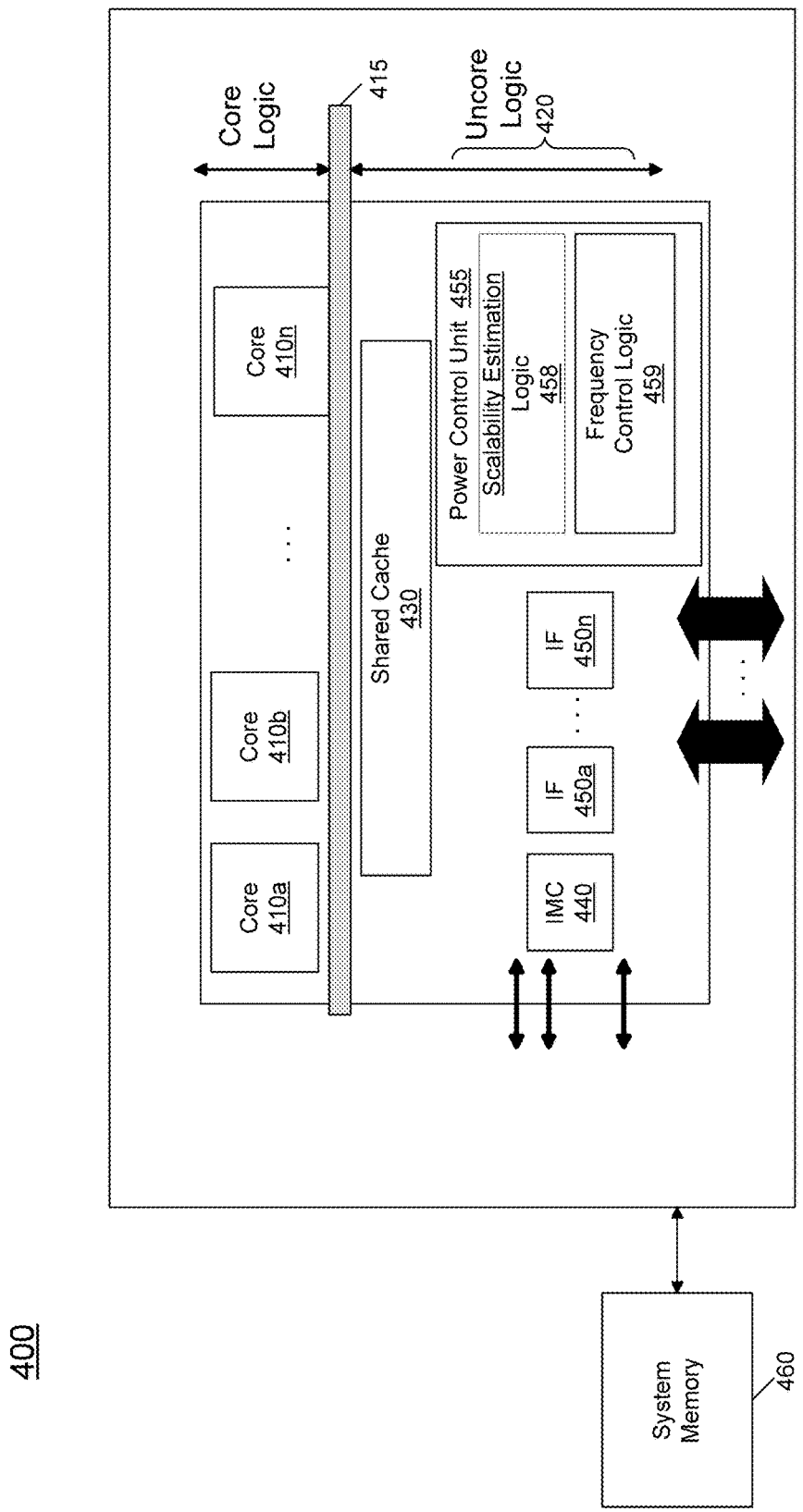
FIG. 5 is a block diagram of a processor in accordance with an embodiment of the present invention.

Embodiments can be implemented in processors for various markets including server processors, desktop processors, mobile processors and so forth. Referring now to FIG. 5, shown is a block diagram of a processor in accordance with an embodiment of the present invention. As shown in FIG. 5, processor 400 may be a multicore processor including a plurality of cores $410_a$-$410_n$. In one embodiment, each such core may be of an independent power domain and can be configured to enter and exit active states and/or maximum performance states based on workload. The various cores may be coupled via an interconnect 415 to a system agent or uncore 420 that includes various components. As seen, the uncore 420 may include a shared cache 430 which may be a last level cache. In addition, the uncore may include an integrated memory controller 440, various interfaces 450 and a power control unit 455. In various embodiments, power control unit 455 may include a scalability estimation logic 458 and a frequency control logic 459 in accordance with an embodiment of the present invention. Using these logics, dynamic estimation and scalability of workloads being performed on one or more domains of the processor may be made and used to control power consumption, e.g., by updating operating frequencies and/or voltages of such domains' frequencies.

With further reference to FIG. 5, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 5, the scope of the present invention is not limited in this regard.

Figure 6:
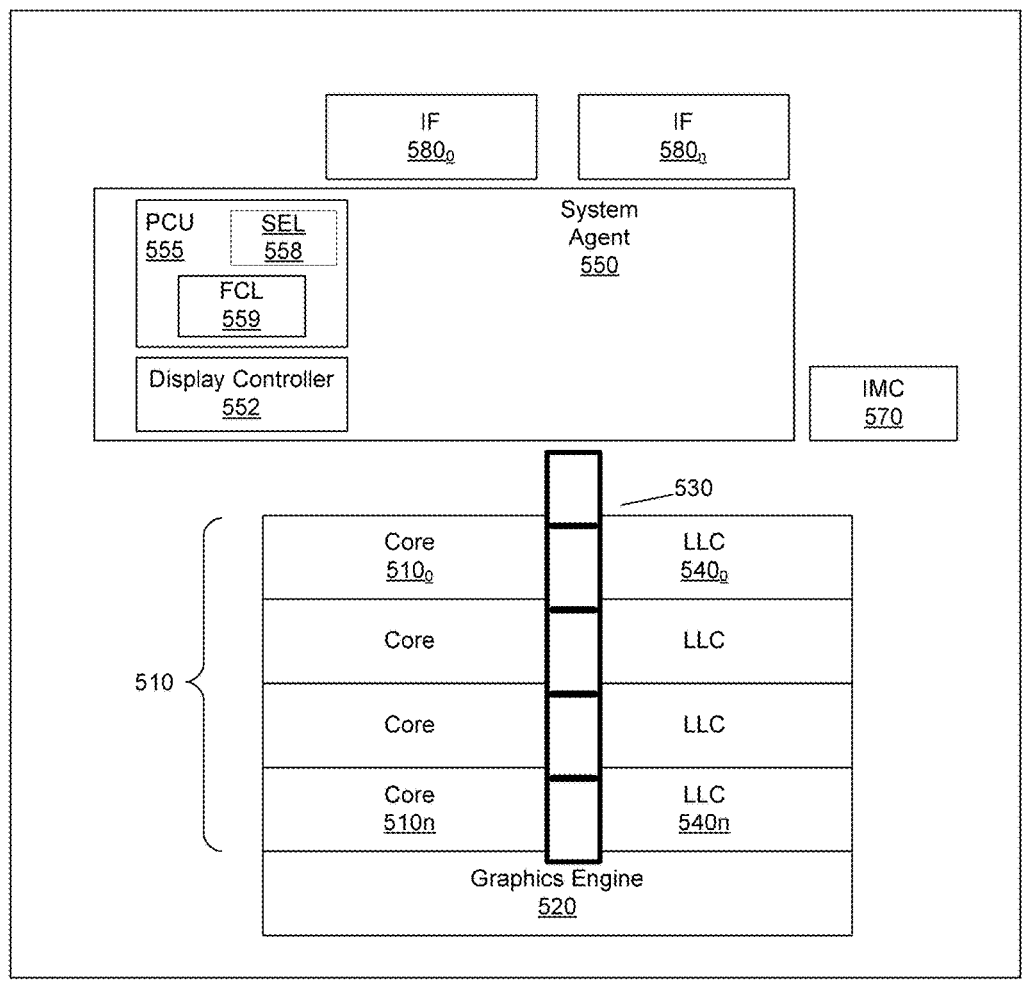
FIG. 6 is a block diagram of a multi-domain processor in accordance with another embodiment of the present invention.

Referring now to FIG. 6, shown is a block diagram of a multi-domain processor in accordance with another embodiment of the present invention. As shown in the embodiment of FIG. 6, processor 500 includes multiple domains. Specifically, a core domain 510 can include a plurality of cores $510_0$-$510_n$, a graphics domain 520 can include one or more graphics engines, and a system agent domain 550 may further be present. In some embodiments, system agent domain 550 may execute at an independent frequency than the core domain and may remain powered on at all times to handle power control events and power management such that domains 510 and 520 can be controlled to dynamically enter into and exit high power and low power states. Each of domains 510 and 520 may operate at different voltage and/or power. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) $540_0$-$540_n$. In various embodiments, LLC 540 may be shared amongst the cores and the graphics engine, as well as various media processing circuitry. As seen, a ring interconnect 530 thus couples the cores together, and provides interconnection between the cores, graphics domain 520 and system agent circuitry 550. In one embodiment, interconnect 530 can be part of the core domain. However in other embodiments the ring interconnect can be of its own domain.

As further seen, system agent domain 550 may include display controller 552 which may provide control of and an interface to an associated display. As further seen, system agent domain 550 may include a power control unit 555 which can include a scalability estimation logic 558 and a frequency control logic 559 in accordance with an embodiment of the present invention to dynamically estimate the workload scalability and control an operating frequency (and/or operating voltage) of one or more cores to balance performance and power consumption. In various embodiments, this logic may execute the algorithm described above in FIG. 3.

As further seen in FIG. 6, processor 500 can further include an integrated memory controller (IMC) 570 that can provide for an interface to a system memory, such as a dynamic random access memory (DRAM). Multiple interfaces $580_0$-$580_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 6, understand the scope of the present invention is not limited in this regard.

Figure 7:
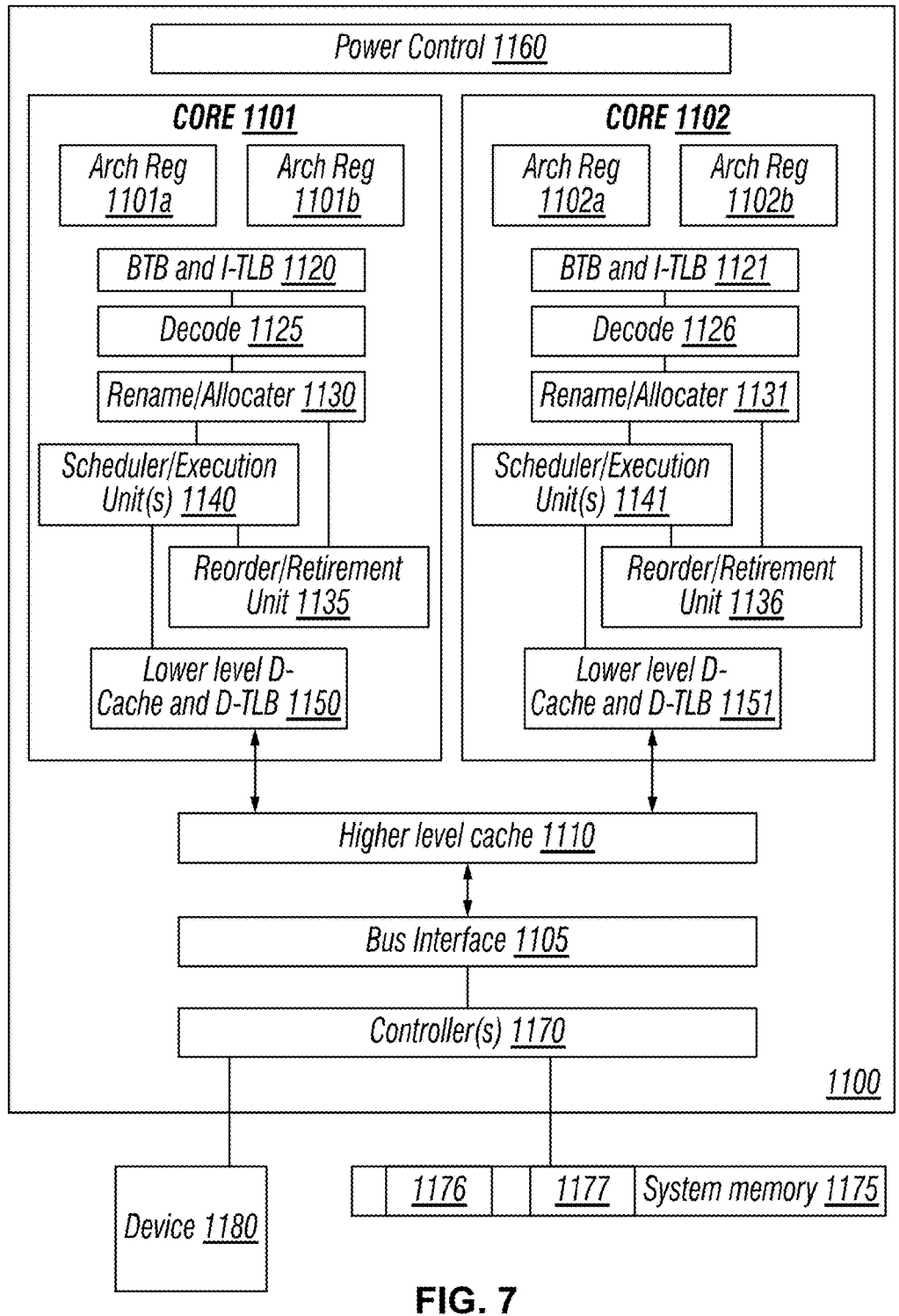
FIG. 7 is a block diagram of a processor including multiple cores in accordance with an embodiment of the present invention.

Referring to FIG. 7, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 7, includes two cores, cores 1101 and 1102. Here, cores 1101 and 1102 are considered symmetric cores, i.e., cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As depicted, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, thread slots, or thread units, as described above. As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 7, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101a, 1101b, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101a and 1101b are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power sharing control in accordance with an embodiment of the present invention. Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 8:
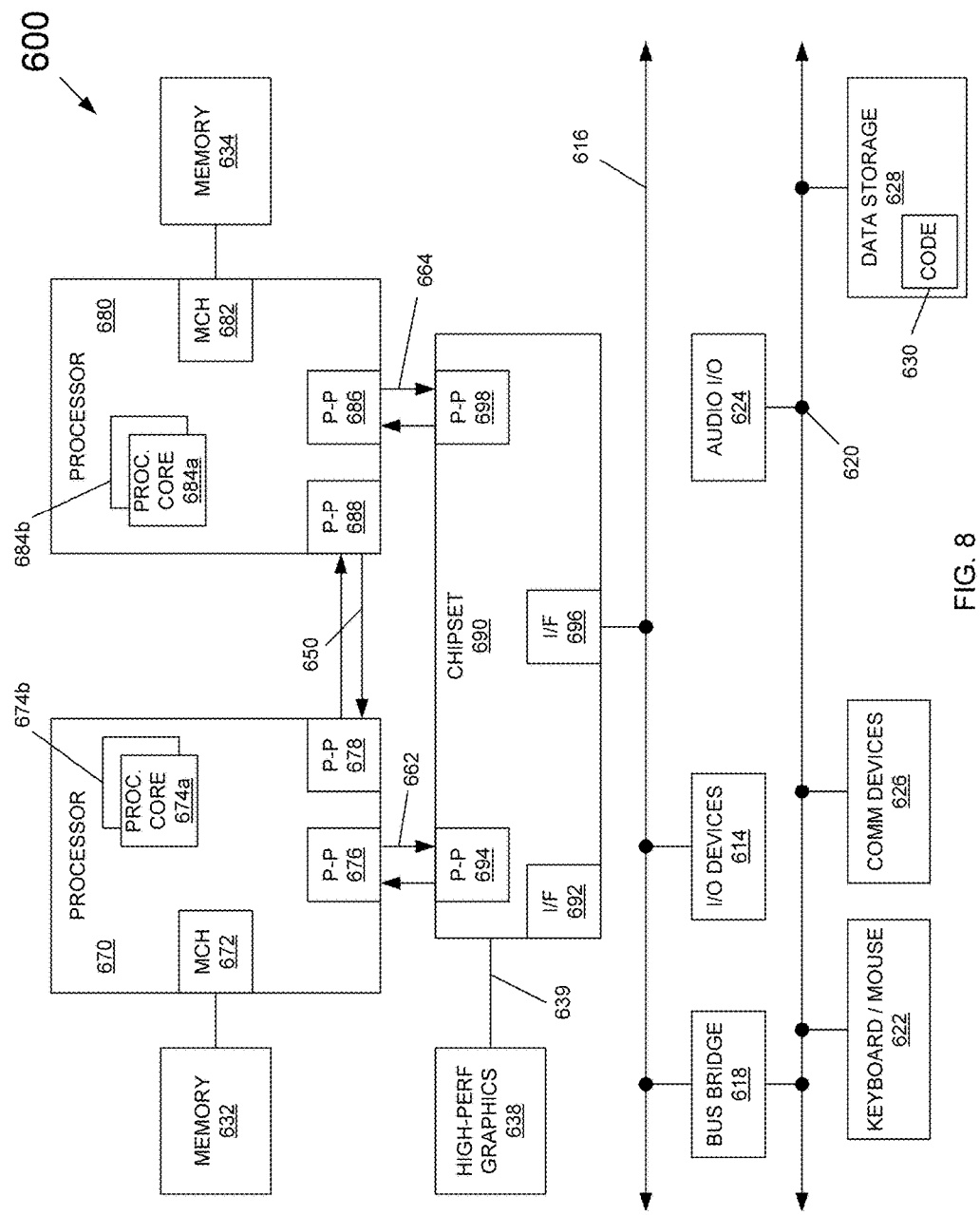
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 600 is a point-to-point interconnect system, and includes a first processor 670 and a second processor 680 coupled via a point-to-point interconnect 650. As shown in FIG. 8, each of processors 670 and 680 may be multicore processors, including first and second processor cores (i.e., processor cores 674*a* and 674*b* and processor cores 684*a* and 684*b*), although potentially many more cores may be present in the processors. Each of the processors can include a PCU or other logic to dynamically estimate scalability of workloads and control processor power consumption based at least on such dynamic estimates, as described herein.

Still referring to FIG. 8, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 8, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 662 and 664, respectively. As shown in FIG. 8, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 8, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

Figure 9:
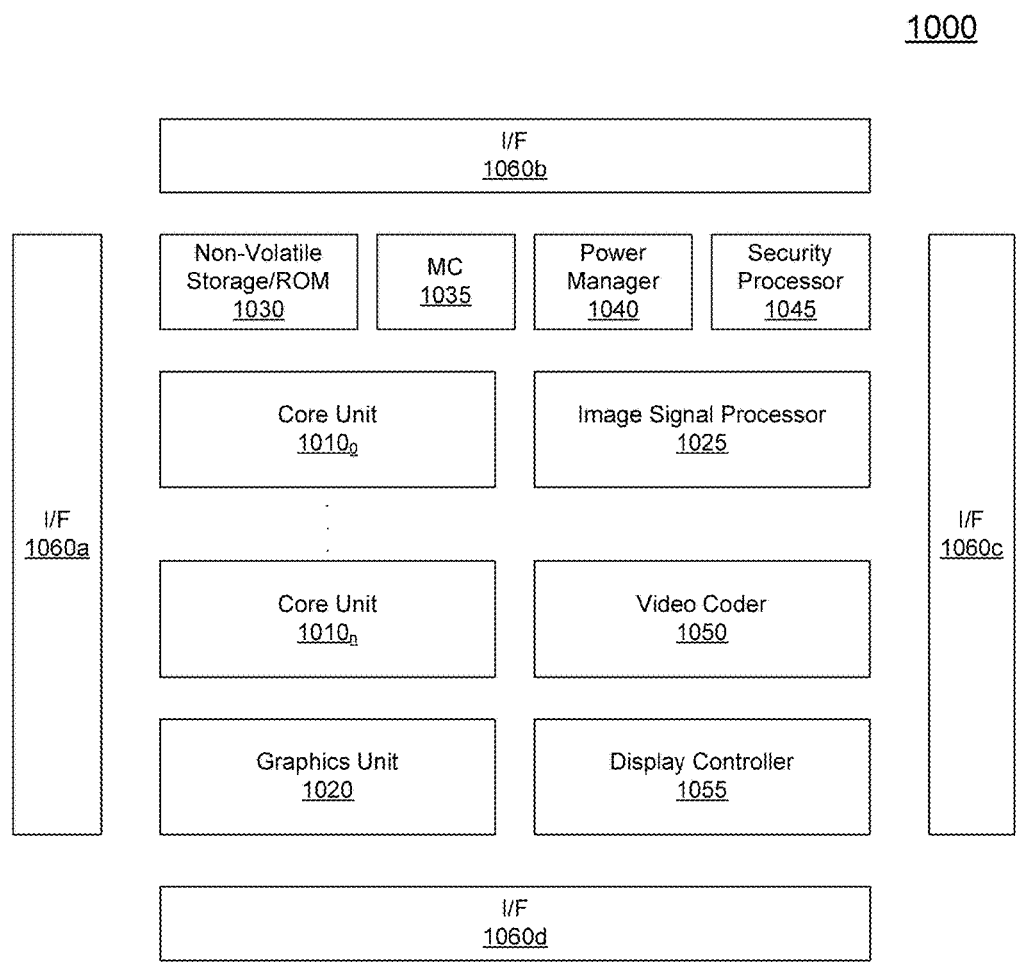
FIG. 9 is a block diagram of a processor in accordance with another embodiment of the present invention.

Referring now to FIG. 9, shown is a block diagram of a processor in accordance with another embodiment of the present invention. In the embodiment of FIG. 9, processor 1000 may be a system on a chip (SoC) including multiple domains, each of which may be controlled to operate at an independent operating voltage and operating frequency. As a specific illustrative example, processor 1000 may be an Intel® Architecture Core™-based processor such as an i3, i5, i7 or another such processor available from Intel Corporation, Santa Clara, Calif. However, other low power processors such as available from Advanced Micro Devices, Inc. (AMD) of Sunnyvale, Calif., an ARM-based design from ARM Holdings, Ltd. or customer thereof or a MIPS-based design from MIPS Technologies, Inc. of Sunnyvale, Calif., or their licensees or adopters may instead be present in other embodiments such as an Apple A5 processor, a Qualcomm Snapdragon processor, or Texas Instruments OMAP processor. Such SoC may be used in a low power system such as a smartphone, tablet computer, Ultrabook™ computer or other portable computing device.

In the high level view shown in FIG. 9, processor 1000 includes a plurality of core units $1010_0$-$1010_n$. Each core unit may include one or more processor cores, one or more cache memories and other circuitry. Each core unit 1010 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.) or other instruction set or combinations thereof. Note that some of the core units may be heterogeneous resources (e.g., of a different design). In addition, each such core may be coupled to a cache memory which in an embodiment may be a shared level (L2) cache memory. A non-volatile storage 1030 may be used to store various program and other data. For example, this storage may be used to store at least portions of microcode, boot information such as a BIOS, other system software or so forth.

Each core unit 1010 may also include an interface such as a bus interface unit to enable interconnection to additional circuitry of the processor. In an embodiment, each core unit 1010 couples to a coherent fabric that may act as a primary cache coherent on-die interconnect that in turn couples to a memory controller 1035. In turn, memory controller 1035 controls communications with a memory such as a dynamic random access memory (DRAM) (not shown for ease of illustration in FIG. 9).

In addition to core units, additional processing engines are present within the processor, including at least one graphics unit 1020 which may include one or more graphics processing units (GPUs) to perform graphics processing as well as to possibly execute general purpose operations on the graphics processor (so-called GPGPU operation). In addition, at least one image signal processor 1025 may be present. Signal processor 1025 may be configured to process incoming image data received from one or more capture devices, either internal to the SoC or off-chip. Other accelerators also may be present. In the illustration of FIG. 9, a video coder 1050 may perform coding operations including encoding and decoding for video information, e.g., providing hardware acceleration support for high definition video content. A display controller 1055 further may be provided to accelerate display operations including providing support for internal and external displays of a system. In addition, a security processor 1045 may be present to perform security operations such as secure boot operations, various cryptography operations and so forth.

Each of the units may have its power consumption controlled via a power manager 1040. Power manager 1040 includes control logic to perform dynamic scalability analysis and corresponding processor power management based thereon, as described herein.

In some embodiments, SoC 1000 may further include a non-coherent fabric coupled to the coherent fabric to which various peripheral devices may couple. One or more interfaces 1060a-1060d enable communication with one or more off-chip devices. Such communications may be according to a variety of communication protocols such as PCIe™ GPIO, USB, I2C, UART, MIPI, SDIO, DDR, SPI, HDMI, among other types of communication protocols. Although shown at this high level in the embodiment of FIG. 9, understand the scope of the present invention is not limited in this regard.

The following examples pertain to further embodiments.

In one example, a processor includes a first logic to calculate a scalability value for a domain of the processor based at least in part on an active state residency of the domain, a stall duration of the domain and a memory bandwidth of the domain, and to determine an operating frequency update for the domain based on a current operating frequency of the domain and the scalability value.

In an example, the first logic is to determine the active state residency, the stall duration, and the memory bandwidth for the domain during an evaluation time interval. The domain may include an active state residency counter and a stall counter, in an example, and a plurality of memory bandwidth counters each to count a number of transactions between the domain and a system memory coupled to the processor.

In an example, the first logic is to estimate the scalability value according to: $(A*C0\_counts+B*Stall\_counts)/C0\_counts$, where $C0\_counts$ is a value of the active state residency counter, $stall\_counts$ is a value of the stall counter, and A and B are coefficients. Values of the coefficients may be determined according to a linear regression analysis. In an embodiment, the linear regression analysis includes execution of each of a plurality of workloads at a different operating frequency, to obtain a scalability value calculated at each of the different operating frequencies, where the coefficients are determined based on the scalability values.

In an example, the first logic is to calculate the scalability value using a first set of coefficients for a first workload and to calculate the scalability value using a second set of coefficients for a second workload. Also, the first logic may calculate the scalability value according to a first time interval for the first workload and calculate the scalability value according to a second time interval for the second workload.

In an example, a storage includes a plurality of entries each to store a set of coefficients for a given type of workload, the set of coefficients of a first entry used to calculate the scalability value for a workload of a first type, and the set of coefficients of a second entry used to calculate the scalability value for a workload of a second type.

In an example, a power controller is coupled to the first logic, and is to receive the scalability value for each of a plurality of domains of the processor and to adjust an operating frequency of at least one of the plurality of domains based at least in part on the scalability values. The power controller may communicate the scalability value for each of the plurality of domains to a system agent and receive from the system agent a power management hint responsive to the communication. In addition, the power controller may adjust the operating frequency further based on the power management hint.

Note that the above processor can be implemented using various means.

In an example, the processor comprises a SoC incorporated in a user equipment touch-enabled device.

In another example, a system comprises a display and a memory, and includes the processor of one or more of the above examples.

In another example, a machine-readable medium has stored thereon instructions, which if performed by a machine cause the machine to perform a method comprising: calculating a scalability value based at least in part on an active state residency, a stall duration, and a memory bandwidth for each of a plurality of domains of a processor each executing a phase of a workload; determining an operating frequency for one or more of the plurality of domains based at least in part on the scalability values; and adjusting an operating frequency of one or more of the plurality of domains responsive to the determining, including increasing an operating frequency of a first domain executing a first workload phase having a first scalability value and decreasing an operating frequency of a second domain executing a second workload phase having a second scalability value. The second scalability value may be less than the first scalability value.

The method further comprises receiving from the first domain the active state residency for the first domain, the stall duration for the first domain and the memory bandwidth for the first domain during a time interval, in an example.

In an example, calculating the scalability value for the first domain comprises executing, on the first domain, each of a plurality of workloads at a different operating frequency and calculating the scalability value at each of the different operating frequencies. In one example, calculating the scalability value for the first domain is according to: (A*C0_counts+B*Stall_counts)/C0_counts, where C0_counts is a value of an active state residency counter, stall_counts is a value of a stall counter, and A and B are coefficients.

In an example, the method further comprises calculating the scalability value using a first set of coefficients for a first workload and calculating the scalability value using a second set of coefficients for a second workload.

In another example, a computer readable medium including instructions is to perform the method of any of the above examples.

In another example, an apparatus comprises means for performing the method of any one of the above examples.

In another example, a system includes a multicore processor having a plurality of domains each to independently execute operations and a power controller including a frequency control logic to control an operating frequency of each of the plurality of domains. The power controller further may include a logic to calculate a scalability value for a domain of the plurality of domains based at least in part on an active state residency of the domain, a stall duration of the domain and a memory bandwidth of the domain, where the frequency control logic is to determine an operating frequency update for the domain based on the scalability value. The system may further include a DRAM coupled to the multicore processor.

In an example, a first domain of the plurality of domains comprises: an active state residency counter to maintain a measure of the active state residency for the first domain; a stall counter to maintain a measure of the stall duration, where the stall duration corresponds to a portion of the active state residency in which the first domain is stalled; and at least one memory bandwidth counter to maintain a measure of the memory bandwidth, where the memory bandwidth corresponds to a bandwidth of the first domain with respect to the DRAM.

In an example, the frequency control logic may receive the scalability value for each of the plurality of domains and adjust an operating frequency of at least one of the plurality of domains based at least in part on the scalability value. The frequency control logic may increase an operating frequency of a first domain and decrease an operating frequency of a second domain based at least in part on the scalabilty values of the first and second domains, where the first domain is in execution of a first workload phase having a first scalability value and the second domain is in execution of a second workload phase having a second scalability value.

In another example, an apparatus comprises: a first domain including at least one first compute engine to execute instructions; a second domain including at least one second engine; and a first logic to calculate a scalability value for the first domain based at least in part on an active state residency of the first domain, a stall duration of the first domain and a memory bandwidth of the first domain, and to determine an operating frequency update for the second domain based at least in part on the scalability value for the first domain.

In an example, the first logic is to increase an operating frequency of the second domain when the scalability value for the first domain is less than a threshold value. In an example, the second domain comprises a memory subsystem, and the increase to the operating frequency of the second domain is to increase a memory bandwidth available to the first domain. In addition, the first logic is to reduce an operating frequency of the first domain when the scalability value for the first domain is less than the threshold value.

Understand that various combinations of the above examples are possible.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a first logic to calculate a scalability value for a domain of the processor based at least in part on an active state residency of the domain, a stall duration of the domain and memory bandwidth information of the domain, and to determine an operating frequency update for the domain based on a current operating frequency of the domain and the scalability value, wherein the domain includes an active state residency counter to count a number of cycles of an evaluation time interval in which the domain is in an active state, a stall counter to count a number of cycles of the evaluation time interval in which the domain is in a stall state in which execution units of the domain are waiting for a memory transaction to complete to make forward progress and a plurality of memory bandwidth counters to count a number of transactions between the domain and a system memory coupled to the processor, the first logic to determine the active state residency based on a value of the active state residency counter and to determine the stall duration based on a value of the stall counter, and to calculate the scalability value according to:

$$(A*C0\_residency\_time + B*memory\_stalled\_time + C*memory\_read\_bandwidth + D*memory\_write\_bandwidth)/C0\_residency\_time,$$

wherein C0_residency_time is a value of the active state residency counter, memory_stalled_time is a value of the stall counter, memory_read_bandwidth and memory_write_bandwidth are values of the plurality of memory bandwidth counters and A, B, C and D are coefficients selected based on a workload executed in the processor.

2. The processor of claim 1, wherein values of the coefficients are determined according to a linear regression analysis.

3. The processor of claim 2, wherein the linear regression analysis includes execution of each of a plurality of workloads at a different operating frequency, to obtain a scalability value calculated at each of the different operating frequencies, wherein the coefficients are determined based on the scalability values.

4. The processor of claim 1, wherein the first logic is to calculate the scalability value using a first set of coefficients for a first workload and to calculate the scalability value using a second set of coefficients for a second workload.

5. The processor of claim 4, wherein the first logic is to calculate the scalability value according to a first time interval for the first workload and to calculate the scalability value according to a second time interval for the second workload.

6. The processor of claim 1, further comprising a storage including a plurality of entries each to store a set of coefficients for a given type of workload, the set of coefficients of a first entry used to calculate the scalability value for a workload of a first type, and the set of coefficients of a second entry used to calculate the scalability value for a workload of a second type.

7. The processor of claim 1, further comprising a power controller coupled to the first logic, wherein the power controller is to receive the scalability value for each of a plurality of domains of the processor and to adjust an operating frequency of at least one of the plurality of domains based at least in part on the scalability values.

8. The processor of claim 7, wherein the power controller is to communicate the scalability value for each of the plurality of domains to a system agent and to receive from the system agent a power management hint responsive to the communication.

9. The processor of claim 8, wherein the power controller is to adjust the operating frequency further based on the power management hint.

10. A non-transitory machine-readable medium having stored thereon instructions, which if performed by a machine cause the machine to perform a method comprising:
calculating a scalability value based at least in part on an active state residency, a stall duration, and a memory bandwidth for each of a plurality of domains of a processor each executing a phase of a workload, wherein the plurality of domains includes an active state residency counter to count a number of cycles of an evaluation time interval in which the domain is in an active state and a stall counter to count a number of cycles of the evaluation time interval in which the domain is in a stall state in which execution units of the domain are waiting for a memory transaction to complete to make forward progress and a plurality of memory bandwidth counters to count a number of transactions between the domain and a system memory coupled to the processor, the active state residency determined based on a value of the active state residency counter and the stall duration determined based on a value of the stall counter, wherein calculating the scalability value for a first domain comprises:
executing, on the first domain, each of a plurality of workloads at a different operating frequency and calculating the scalability value at each of the different operating frequencies according to:

$$(A*C0\_residency\_time + B*memory\_stalled\_time + C*memory\_read\_bandwidth + D*memory\_write\_bandwidth)/C0\_residency\_time,$$

wherein C0_residency_time is a value of the active state residency counter, memory_stalled_time is a value of the stall counter, memory_read_bandwidth and memory_write_bandwidth are values of the plurality of memory bandwidth counters and A, B, C and D are coefficients selected based on the plurality of workloads, the scalability value calculated using a first set of the coefficients for a first workload of the plurality of workloads and using a second set of the coefficients for a second workload of the plurality of workloads;
determining an operating frequency for one or more of the plurality of domains based at least in part on the scalability values; and
adjusting an operating frequency of one or more of the plurality of domains responsive to the determining, including increasing an operating frequency of a first domain executing a first workload phase having a first scalability value and decreasing an operating frequency of a second domain executing a second workload phase having a second scalability value, wherein the second scalability value is less than the first scalability value.

11. The non-transitory machine-readable medium of claim 10, wherein the method further comprises receiving from the first domain the active state residency for the first domain, the stall duration for the first domain and the memory bandwidth for the first domain during a time interval.

12. A system comprising:
a multicore processor including a plurality of domains each to independently execute operations and a power controller including a frequency control logic to control an operating frequency of each of the plurality of domains, the power controller further including a logic to calculate a scalability value for a domain of the plurality of domains based at least in part on an active state residency of the domain, a stall duration of the domain, a memory bandwidth of the domain and a plurality of coefficients based on a workload to execute on the domain, wherein the frequency control logic is to determine an operating frequency update for the domain based on the scalability value, wherein the domain of the plurality of domains comprises:
an active state residency counter to maintain a measure of the active state residency for the domain according to a number of cycles in which the domain is in an active state;
a stall counter to maintain a measure of the stall duration, wherein the stall duration corresponds to a portion of the active state residency in which the domain is stalled according to a number of cycles in which the domain is in a stall state in which execution units of the domain are waiting for a memory transaction to complete to make forward progress; and a plurality of memory bandwidth counters to maintain a measure of the memory bandwidth, wherein the memory bandwidth corresponds to a bandwidth of the domain with respect to a dynamic random access memory (DRAM) and a bandwidth of the domain with respect to an embedded DRAM of the multicore processor, and wherein the logic is to calculate the scalability value according to:

$$(A*C0\_residency\_time+B*memory\_stalled\_time+C*memory\_read\_bandwidth+D*memory\_write\_bandwidth)/C0\_residency\_time,$$

wherein C0_residency_time is a value of the active state residency counter, memory_stalled_time is a value of the stall counter, memory_read_bandwidth and memory_write_bandwidth are values of the plurality of memory bandwidth counters and A, B, C and D are coefficients selected based on a workload executed in the multicore processor; and the DRAM coupled to the multicore processor.

13. The system of claim 12, wherein the frequency control logic is to receive the scalability value for each of the plurality of domains and to adjust an operating frequency of at least one of the plurality of domains based at least in part on the scalability values.

14. The system of claim 13, wherein the frequency control logic is to increase an operating frequency of a first domain and decrease an operating frequency of a second domain based at least in part on the scalabilty values of the first and second domains, wherein the first domain is in execution of a first workload phase having a first scalability value and the second domain is in execution of a second workload phase having a second scalability value, wherein the second scalability value is less than the first scalability value.

15. An apparatus comprising:
a system on chip (SoC) comprising:
a first domain including a plurality of cores having at least one first compute engine to execute instructions;
a second domain including at least one second engine;
a memory controller;
a coherent fabric to couple the plurality of cores to the memory controller;
an image signal processor;
a video coder;
a display controller;
a non-coherent fabric to couple to a plurality of peripheral devices; and
a power manager comprising a first logic to calculate a scalability value for the first domain based at least in part on an active state residency of the first domain, a stall duration of the first domain and a memory bandwidth of the first domain, and to determine an operating frequency update for the second domain based at least in part on the scalability value for the first domain, wherein the first domain includes an active state residency counter to count a number of cycles of an evaluation time interval in which the first domain is in an active state and a stall counter to count a number of cycles of the evaluation time interval in which the first domain is in a stall state in which execution units of the first domain are waiting for a memory transaction to complete to make forward progress, the first logic to determine the active state residency based on a value of the active state residency counter and to determine the stall duration based on a value of the stall counter and to calculate the scalability value according to:

$$(A*C0\_residency\_time+B*memory\_stalled\_time+C*memory\_read\_bandwidth+D*memory\_write\_bandwidth)/C0\_residency\_time,$$

wherein C0_residency_time is a value of the active state residency counter, memory_stalled_time is a value of the stall counter, memory_read_bandwidth and memory_write_bandwidth are values of a plurality of memory bandwidth counters and A, B, C and D are coefficients selected based on a workload executed in the SoC.

16. The apparatus of claim 15, wherein the first logic is to increase an operating frequency of the second domain when the scalability value for the first domain is less than a threshold value.

17. The apparatus of claim 16, wherein the second domain comprises a memory subsystem, and the increase to the operating frequency of the second domain is to increase a memory bandwidth available to the first domain.

18. The apparatus of claim 16, wherein the first logic is to reduce an operating frequency of the first domain when the scalability value for the first domain is less than the threshold value.

* * * * *